UNITED STATES PATENT OFFICE.

ADOLPHUS SPIEGEL, OF HÖCHST-ON-THE-MAIN, GERMANY, ASSIGNOR TO FARBWERKE, VORMALS MEISTER, LUCIUS & BRÜNING.

MANUFACTURE OF BISULPHITE COMPOUNDS OF AZO COLORING-MATTERS.

SPECIFICATION forming part of Letters Patent No. 306,546, dated October 14, 1884.

Application filed April 25, 1884. (No specimens.)

*To all whom it may concern:*

Be it known that I, ADOLPHUS SPIEGEL, a citizen of the Empire of Germany, residing at Höchst-on-the-Main, in Empire of Germany, have invented certain new and useful Improvements in the Manufacture of Bisulphite Compounds of Azo Coloring-Matters; and I do hereby declare the following to be a full, clear, and exact description of the invention, such as will enable others skilled in the art to which it appertains to make and use the same.

This invention relates to a new process of converting the coloring-matters belonging to the well-known series of azo coloring-matters soluble in spirit—*i. e.*, which are not sulphonic acids—into new compounds soluble in water by combining such azo coloring-matters with the bisulphites of alkalies.

In carrying out my invention I take one of the several coloring-matters belonging to the well-known series of azo coloring-matters soluble in spirit—*i. e.*, which is no sulphonic acid—such as are obtained according to the method discovered and patented by Peter Griess, and well understood by chemists as being formed by combining a diazotized organic base of the aromatic series with an aromatic hydroxylated compound—such as phenol or naphthol—or with another base, such as methylaniline or diphenylamine. Of any such azo coloring-matter I take a quantity of, say, fourteen pounds, and dissolve or suspend the same in a quantity of, say, one hundred and twelve pounds of spirits of wine, adding thereunto, say, twenty-eight pounds of a concentrated solution of the bisulphite of an alkali or other base the bisulphite of which is soluble in spirits of wine, and in a closed vessel, or in one supplied with a reversed cooler, heat the mixture upon the water bath for, say, three hours, stirring all the time. By this treatment the bisulphite is caused to combine with the coloring-matter employed to form a compound of the said azo coloring-matter with the bisulphite in question. To separate the bisulphite compound referred to, the spirit is distilled off and the residue allowed to cool, whereupon it will be found to consist of a paste of crystals. These latter are filtered from the suspending liquid, and now represent the above-mentioned bisulphite compound.

The compound prepared as just described is distinguished by the following properties: They are more or less soluble in water, forming yellow solutions with more or less of a red tint. Textile fiber is dyed unstable yellow or reddish shades by steeping it in such a solution. When the said compound is boiled with water, or when it is treated with an alkaline agent, or when it is heated with the solution of a nitrite, the bisulphite compound is decomposed and the azo coloring-matter from which it had been prepared or the salt of the latter is precipitated.

I do not wish to be understood as claiming, broadly, the production of bisulphite compounds of azo coloring-matters.

What I claim as new, and desire to secure by Letters Patent, is—

The within-described process for the conversion of coloring-matters belonging to the well-known series of azo coloring-matters—soluble in spirit and which are not sulphonic acids—into an unstable compound of the azo coloring-matter employed by reacting upon such coloring-matter with the solution of the bisulphite of an alkali or other base in the presence of spirit or any equivalent solvent agent.

In testimony whereof I affix my signature in presence of two witnesses.

ADOLPHUS SPIEGEL.

Witnesses:
F. VOGELER,
A. S. HOGUE.